Dec. 14, 1948.  R. J. STENGL ET AL  2,456,032
FUEL CONTROL DEVICE FOR SUBMERGED BURNERS
Filed July 4, 1944  2 Sheets-Sheet 1
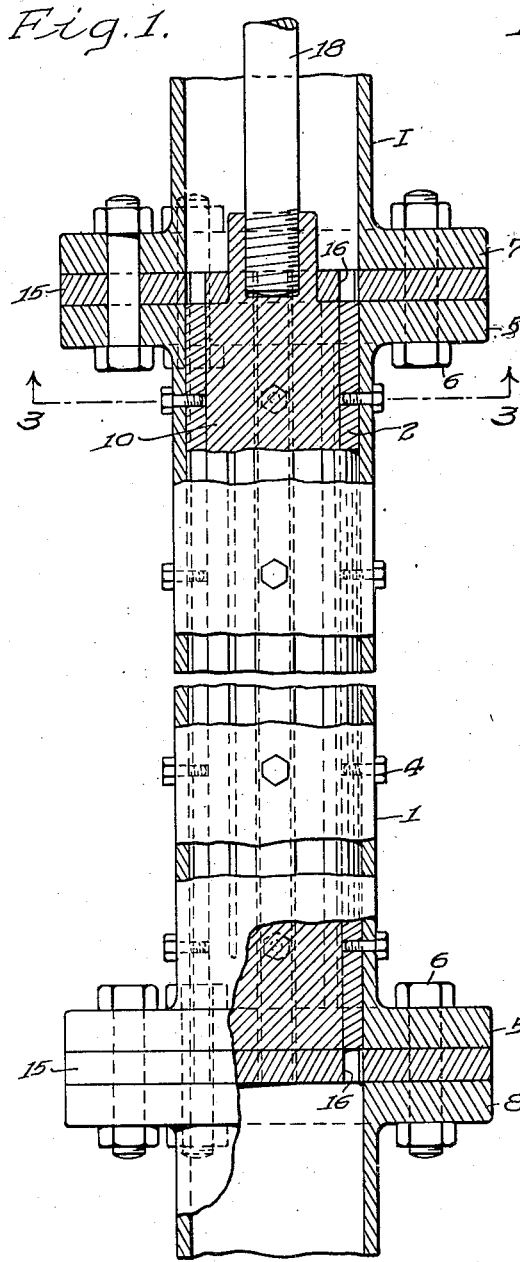
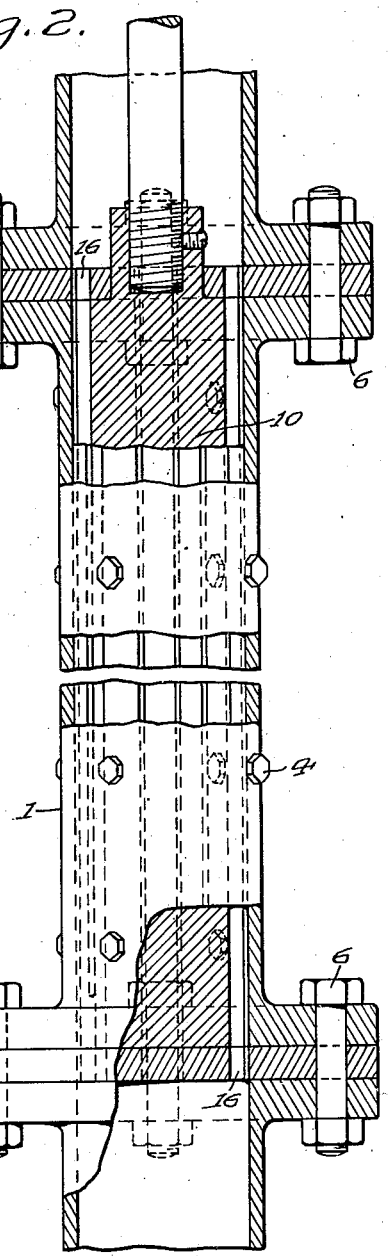
INVENTORS
Rudolph J. Stengl,
Floyd B. Bedwell.
BY
ATTORNEY
WITNESS Dec. 14, 1948.   R. J. STENGL ET AL   2,456,032
FUEL CONTROL DEVICE FOR SUBMERGED BURNERS
Filed July 4, 1944   2 Sheets-Sheet 2
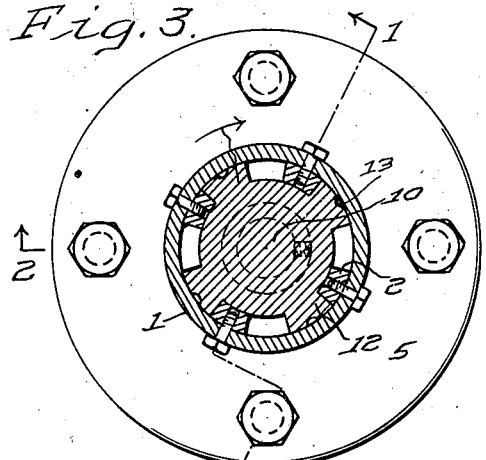
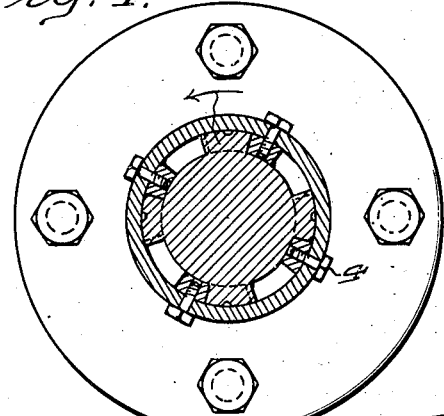
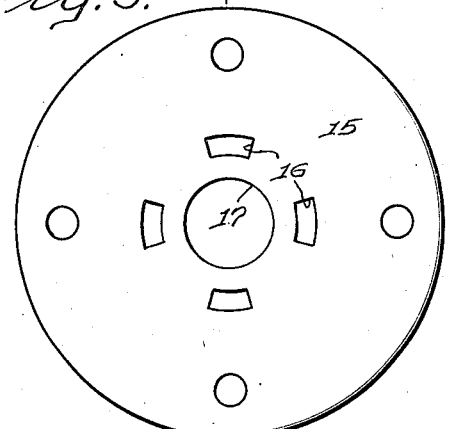
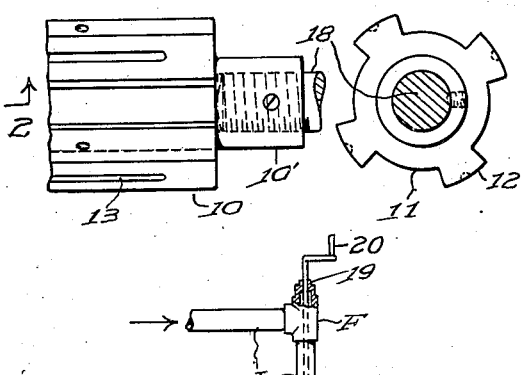
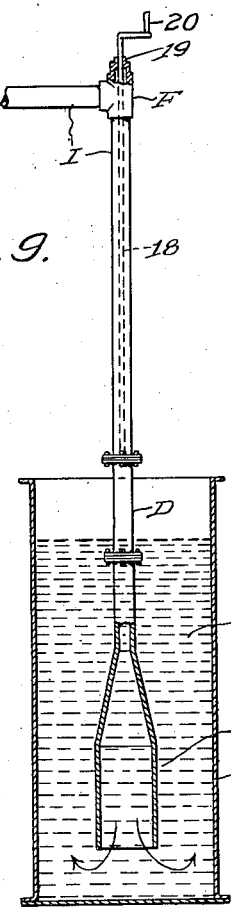
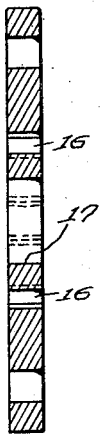
WITNESS
F. J. Hartman.
INVENTORS
Rudolph J. Stengl,
Floyd B. Bedwell.
BY George K. Hallard
ATTORNEY Patented Dec. 14, 1948

2,456,032

UNITED STATES PATENT OFFICE 2,456,032

FUEL CONTROL DEVICE FOR SUBMERGED BURNERS

Rudolph J. Stengl and Floyd B. Bedwell, Tulsa, Okla., assignors to Ozark-Mahoning Company, a corporation of Delaware Application July 4, 1944, Serial No. 543,470

6 Claims. (Cl. 251—84)

This invention is directed to the provision of means for controlling the amount of combustible mixture of air and gas supplied to submerged burners of the character disclosed in United States Letters Patent 2,159,759, granted May 23, 1939, which are employed for many industrial purposes including recarbonation of water in accordance with the method of United States Letters Patent 2,182,286, granted December 5, 1939, and as it is of particular utility with burners utilized therein it will be explained more particularly with reference thereto although equally applicable to submerged burners used for other purposes.

In designing a recarbonation system the size of the burner is primarily determined by the maximum volume of combustible gases required to treat the given amount of water passing the burner per unit of time and normally one is selected of sufficient capacity to adequately treat that amount when the burner is operating at its maximum rate. Thus if conditions remain constant it is only necessary to supply the burner with sufficient fuel to keep it operating at that rate to properly recarbonate the volume of water flowing past it, but it often becomes desirable to reduce the flow of water below the normal amount as during the night or in winter or at other times when less water is being consumed by the users and therefore to decrease the amount of combustible mixture supplied to the burner to correspondingly reduce the products of combustion discharged into the water, not only to maintain the proper ratio therebetween for satisfactory recarbonation but also to economize the amount of gas consumed.

Under given conditions burners of the character in question will operate when the combustible mixture is supplied at any velocity within a relatively wide range, the limits of which are determined in part by the depth of submergence of the burner, but it is desirable for the attainment of optimum results that within this range the velocity be kept constant and about midway between the two extremes. Thus, for example, a burner having an inlet orifice ¾" in diameter and submerged 10' below the surface of the water being treated will operate when the mixture is supplied at velocities between 16,250' and 33,250' per minute, but with a velocity of 25,000' per minute, that is, about midway between the two extremes, gives the best results from the standpoints of smoothness of operation and generally satisfactory performance. Now if some condition arises such as reduced consumption of the water which makes it desirable to reduce the output of the burner, the velocity, irrespective of the volume, of the incoming mixture, must be maintained within the aforesaid range to prevent the burner from going out. So if it is attempted to reduce the burner output by substitution of a smaller inlet orifice, for example ½" instead of ¾" diameter, the velocity of the incoming mixture is increased beyond the point at which the burner will stay lighted, and equally, if it is attempted to increase the output by enlarging the orifice by substitution of, say, one of 1" diameter, the velocity of the incoming mixture is reduced so much that again the burner will not stay lighted. Moreover, to prevent the flame from flashing into the inlet passage it is necessary to maintain a certain velocity in the incoming combustible mixture for a minimum distance before it reaches the burner.

It is therefore an object of our invention to provide a fuel control device for a submerged burner by means of which the requisite velocity of the combustible mixture supplied to the burner may be maintained for the necessary distance behind the latter irrespective of the amount of mixture passing to the device and thence to the burner.

A further object is the provision of such device which is of relatively simple character and adapted for installation with new burners or those already in use; which may be operated with the burner in situ and from a point remote therefrom as from above the surface of the water in which it is submerged or from any other convenient place, and which is effective to give a very accurate control of the mixture passing to the burner.

Other objects, advantages and novel features of design, construction and arrangement comprehended by the invention are hereinafter more particularly pointed out or will be apparent from the following description of one embodiment thereof as illustrated in the accompanying drawings, in which Fig. 1 is a fragmentary vertical axial section of the device and adjacent parts on line 1—1 in Fig. 3;

Fig. 2 is a similar view on line 2—2 in Fig. 3;

Fig. 3 is a transverse section on line 3—3 in Fig. 1;

Fig. 4 is a generally similar section with certain of the parts in a different position;

Fig. 5 is a face view of one of the end plates comprised in the device;

Fig. 6 is a section thereof on line 6—6 in Fig. 5;

Fig. 7 is a fragmentary elevation of one end of the rotatable plug;

Fig. 8 is an end view thereof, while

Fig. 9 is a more or less diagrammatic view on a reduced scale showing the device in operative association and combination with a submerged burner and the means for operating it from a point remote therefrom.

Throughout the drawings like characters of reference are used to designate the same parts and the directions in which the sectional views are taken are indicated by the arrows on the lines showing the plane of section.

For convenience of description reference will first be had to Fig. 9 in which the burner B is shown submerged in a conduit or tank C containing water W. The combustible mixture of air and gas is supplied at suitable pressure through an inlet pipe I extending to suitable valving means (not shown) for metering the amount of mixture admitted thereto, the pipe at a convenient point being directed toward the conduit through the medium of an L-fitting F and thence connected to one end of the control device D to the other end of which in turn the neck of the burner is attached, the device being thus disposed in the inlet pipe adjacent the burner. While for convenience of illustration and explanation the burner is shown as depending vertically into the water, it will be appreciated it may be positioned horizontally or even angularly.

Referring now more particularly to the preceding figures, the control device as shown therein comprises a cylindrical casing 1 provided on its interior with a series of equidistantly spaced ribs 2, desirably four in number, whereby a corresponding number of spaces are left between them. These ribs may be integral with the casing or, as shown, formed by separate strips secured to it by bolts 4 extending through its wall and into the ribs at longitudinally spaced intervals; their inner faces are accurately finished on arcs concentric with the axis of the casing and their sides directed radially inward. At each end the casing is provided with an outwardly extending flange 5 drilled for the passage of bolts 6 which pass through corresponding flanges 7, 8 respectively integral with or screwed onto ends of the inlet pipe and the burner neck, thus operatively positioning the control device with relation to these parts as above described.

Within the casing is an elongated rotatable plug 10 having circumferentially equidistantly spaced, longitudinally extending grooves 11 on its periphery corresponding in number to the ribs on the casing, thus leaving between them a like number of lands 12, which may comprise channels 13 in their outer faces for reception of a suitable lubricant. The maximum diameter of the plug and depth of the grooves 11 are such that when the plug is in place with the ribs projecting into these grooves, the ribs will snugly bottom in the latter to form a sliding fit against the body of the plug and the outer faces of the lands a like sliding fit against the casing wall, all of the contacting surfaces of course being smoothly finished. Each of the grooves 11, the sides of which are radially directed, is preferably made slightly wider circumferentially than twice the corresponding width of each rib so that the space occupied by the latter therein is a little less than one-half that afforded by the groove in which it is disposed.

The plug extends from one end of the casing to the other terminating flush with the faces of flanges 5, 5, and against each said flange and thus against the adjacent end of the plug is an end plate 15, one of which is best shown in Figs. 5 and 6. These plates, alike in all particulars save one hereinafter mentioned, are preferably of the same diameter as flanges 5, drilled for the passage of bolts 6 and provided with a series of annularly spaced ports 16 each of the same size and configuration as the spaces in grooves 11 which are not occupied by the ribs when the plug is in the position shown in Figs. 1 and 3, the ports being located so as to respectively register with the said spaces.

That end of the plug proximate the end of the device intended for attachment to inlet pipe I carries a cylindrical axial extension 10' of less diameter than the body of the plug, and the adjacent end plate 15 is centrally bored at 17 for its passage. This extension is bored and threaded for reception of an operating rod 18 which, when assembled with the plug, is prevented from unscrewing therefrom by a set screw. The rod extends through the inlet pipe which is made large enough so that its effective area is not unduly diminished thereby, and then through fitting F (Fig. 9) which may be provided with a stuffing box or other means 19 forming a fluid-tight joint at the point of exit of the rod to the extremity of which outside the fitting an operating crank 20 is secured.

Thus when the control device is assembed with the burner and inlet pipe as heretofore described the plug can be turned within the casing for a limited distance in either direction by operation of crank 20 located at a point remote from the burner and the liquid in which it is submerged. Consequently if the crank is moved counterclockwise when the assembly is viewed as in the drawings until the movement of the plug is arrested by contact of its lands with the casing ribs (Figs. 1 and 3), the combustible mixture can pass from the inlet pipe through the ports in the upper end plate, thence through the unoccupied spaces in the grooves 11 in the plug aligned therewith and finally through the ports in the other end plate communicating with the neck of the burner, the combined effective area of the ports and grooves through which the mixture travels preferably being made sufficient to allow as much of it to reach the burner as the latter is capable of handling; in other words to permit the burner to operate at maximum capacity.

Whenever it is desired to reduce the output of the burner, however, the mixture metering means in the inlet pipe is suitably regulated either automatically or manually and the plug turned in the casing for a suitable amount by moving crank 20 in a clockwise direction, thus progressively decreasing the effective area of the spaces in grooves 11 and of the ports in the end plates with corresponding reduction in the amount of mixture which can pass through them to the burner. The volume of combustible mixture admitted to the burner can in this way be reduced to any desired extent without, however, appreciably changing its velocity in the control device with the result that the combustible mixture is delivered to the burner at a substantially constant velocity irrespective of whether the burner is operating at maximum or reduced capacity and the conditions requisite for optimum performance therefore maintained. Further, since by suitable arrangement of the inlet piping the fitting F can be located at any convenient point remote from the control device, adjustment of the latter can be readily effected whenever required and preferably automatically in conjunction with the mixture metering means without in any way disturbing the burner or the necessity of putting it out of operation.

To insure against flashing back of the burning mixture the fuel control device should be of sufficient length, as shown, to maintain a constant mixture velocity for a minimum distance behind the burner; for example, for a burner operating at 10′ submergence with mixture velocity of 25,000′ per minute as heretofore mentioned, the minimum length required for optimum results is a distance in inches of $$25\sqrt{\frac{4A}{\pi}}$$

where A is the total area in square inches of the passages in the control device through which the mixture is admitted to the burner, and this is equally true for other depths of submergence from about 1′ to 15′.

While we have herein described one form of the invention which under practical conditions of operation we have found most effective for its intended purpose, we do not thereby desire or intend to confine or restrict ourselves specifically thereto as numerous changes and modifications may be made in the design, construction, arrangement and method of assembly of the various elements comprised in the device and in its manner of installation in relation to the burner which it is to control, without departing from the spirit and scope of the invention as defined in the appended claims.

Having thus described our invention, we claim and desire to protect by Letters Patent of the United States:

1. A fuel control device for a submerged burner adapted for interposition between the latter and an inlet pipe for conveying a combustible gaseous mixture thereto, and comprising an elongated hollow casing having circumferentially spaced internal ribs, a rotatable plug within the casing having external grooves respectively receiving said ribs and each of greater circumferential length than and of a radial width substantially equal to that of the rib received therein and lands between adjacent grooves extending to and in sliding engagement with the casing wall between the ribs, means adjacent an end of the casing and engaging the proximate ends of the ribs providing ports respectively registering with portions of the spaces between the ribs, the effective shape and area of each port substantially conforming to that portion of the adjacent groove unoccupied by the corresponding rib when the plug is at one limit of its rotative travel, and means operable from a point remote from the device for rotating the plug from said position to diminish the effective areas of said ports and spaces for the passage of the mixture to the burner.

2. A fuel control device for a submerged burner adapted for interposition between the latter and an inlet pipe for conveying a combustible gaseous mixture thereto, and comprising an elongated hollow casing having circumferentially spaced internal ribs, a rotatable plug within the casing having external grooves respectively receiving said ribs and each of greater circumferential length than and of radial width substantially equal to that of the rib received therein and lands between adjacent grooves extending to and in sliding engagement with the casing wall between the ribs, means adjacent an end of the casing overlying the corresponding ends of the grooves and ribs providing ports respectively registering with the spaces defined by a segment of the inner surface of the casing, a side of the rib adjacent said segment, a segment of the bottom of the groove receiving said rib and an adjacent side of said groove when the rib is in engagement with the other side thereof, and means operable from a point remote from the device for rotating the plug to cause each of the first mentioned sides of the grooves to approach circumferentially the proximate sides of the corresponding ribs.

3. A fuel control device for a submerged burner adapted for interposition between the latter and an inlet pipe for conveying a combustible gaseous mixture thereto, and comprising an elongated hollow cylindrical casing having internal circumferentially spaced radially directed ribs terminating adjacent its ends, a plate at each of said ends abutting the proximate ends of the ribs and having spaced ports aligned with the spaces between the latter, a plug rotatably positioned in the casing having axially extending grooves in its periphery respectively receiving said ribs and each of greater circumferential length than the rib received therein, and lands between the grooves extending radially across the spaces between the ribs on said casing into sliding contact with the casing wall and axially into sliding contact with the plate, the ports being so proportioned with respect to the spaces respectively adjacent thereto that when the plug is turned so as to bring one side of each land into engagement with the opposed side of the proximate rib the effective area of each port substantially equals that of the space aligned therewith, and as the plug is thereafter turned in a direction to separate the ribs and lands the effective areas of the ports and spaces are progressively reduced, and means operable from a point outside the casing for rotating the plug.

4. A control device adapted for interposition between a submerged burner and an inlet pipe adapted to convey a combustible gaseous mixture thereto, and comprising an elongated hollow cylindrical casing having internal circumferentially spaced radial ribs terminating at its ends, an end plate at each said ends having spaced ports registering with the spaces between the casing ribs, a plug rotatably disposed in the casing with its ends respectively engaging said plates and having longitudinally extending grooves in its periphery respectively receiving the casing ribs and each of greater circumferential length than the rib received therein, and lands between the grooves extending radially across said spaces into sliding contact with the casing wall and axially into sliding contact with the plates, the ports being so proportioned with respect to the spaces respectively adjacent thereto that when the plug is positioned so as to bring one side of each land into engagement with the opposed side of the proximated rib the effective area of each port substantially equals that of the space aligned therewith and the lands are out of registry with the ports, the plug also having an axial extension projecting through the plate proximate the inlet pipe, and a rod secured to said extension and extending in said pipe and thence outwardly therefrom to a point remote from the burner, whereby by turning the rod in a direction to separate said previously engaged sides of the lands and ribs the lands may be progressively brought into registry with the ports to diminish the effective areas thereof and of the spaces aligned therewith.

5. A fuel control device for a submerged burner comprising an elongated hollow casing having internal circumferentially spaced ribs extending to one end thereof, an end plate proximate said end having ports registering respectively with portions of the spaces between the ribs, a plug rotatable in the casing engaging said plate and having axially extending peripheral grooves respectively receiving the ribs and each of greater circumferential length than the rib received therein and lands between the grooves projecting radially across said spaces into sliding engagement with the casing wall and adapted when the plug is at one limit of its rotational travel to occupy the remaining portions of said spaces, and means extending from the plug to a point remote therefrom operable to rotate the plug in the casing to thereby move the lands progressively into registry with the ports until the latter are closed when the plug substantially reaches the other limit of said travel.

6. A fuel control device for a submerged burner adapted for interposition between the latter and its inlet pipe and comprising an elongated hollow casing having circumferentially spaced radially directed internal ribs, a plate at each end of the casing engaging the ends of the ribs and having ports respectively registering with a part of the space between each adjacent pair thereof, a plug rotatable in the casing having exterior grooves corresponding in number to the ribs and respectively receiving the latter and each of greater circumferential length than the rib received therein and lands extending into the spaces between the ribs, slidably engaging the casing wall and the plate and in circumferential width approximating the corresponding width of the ports whereby when the plug is turned to the respective limits of its movement in either direction the lands are either out of registry or in full registry with the ports and when the plug is positioned between said limits the lands are partially in registry with the ports and thereby decrease their effective area for the passage of combustible mixture to the burner.

RUDOLPH J. STENGL.
FLOYD B. BEDWELL.

REFERENCES CITED

The following references are of record in the file of this patent:

UNITED STATES PATENTS

| Number | Name | Date |
|---|---|---|
| 541,779 | Villeneuve | June 25, 1895 |
| 2,086,902 | Doennecke et al. | July 13, 1937 |
| 2,159,759 | Doennecke et al. | May 23, 1939 |
| 2,210,559 | Albright | Aug. 5, 1940 |

FOREIGN PATENTS

| Number | Country | Date |
|---|---|---|
| 5,683 | Great Britain | Apr. 15, 1915 |